(12) United States Patent
Gitzen et al.

(10) Patent No.: US 11,766,903 B2
(45) Date of Patent: Sep. 26, 2023

(54) FIFTH WHEEL COUPLING COMPRISING A COUPLING PLATE AND A CAMERA

(71) Applicant: JOST-WERKE DEUTSCHLAND GMBH, Neu-Isenburg (DE)

(72) Inventors: Stephan Gitzen, Riedstadt (DE); Mark Müller, Frankfurt (DE); Swen Saupe, Mainz (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 0 days.

(21) Appl. No.: 17/785,641

(22) PCT Filed: Dec. 2, 2020

(86) PCT No.: PCT/IB2020/061370
§ 371 (c)(1),
(2) Date: Jun. 15, 2022

(87) PCT Pub. No.: WO2021/123990
PCT Pub. Date: Jun. 24, 2021

(65) Prior Publication Data
US 2023/0054406 A1    Feb. 23, 2023

(30) Foreign Application Priority Data

Dec. 20, 2019   (DE) .......................... 102019008918.9

(51) Int. Cl.
*B60D 1/01*   (2006.01)
*B60D 1/36*   (2006.01)
(Continued)

(52) U.S. Cl.
CPC .............. *B60D 1/015* (2013.01); *B60D 1/36* (2013.01); *B60D 1/62* (2013.01); *B60R 11/04* (2013.01); *B60R 2300/808* (2013.01)

(58) Field of Classification Search
CPC .. B60D 1/015; B60D 1/36; B60D 1/62; B60R 11/04; B60R 2300/808
See application file for complete search history.

(56) References Cited

U.S. PATENT DOCUMENTS

| | | | |
|---|---|---|---|
| 2008/0191449 A1* | 8/2008 | Standen | B60T 7/20 280/477 |
| 2014/0151979 A1 | 6/2014 | Puckett et al. | |
| 2017/0036600 A1* | 2/2017 | Whitehead | B60R 1/00 |

FOREIGN PATENT DOCUMENTS

| | | |
|---|---|---|
| DE | 1445555 A1 | 6/1995 |
| DE | 102004029130 A1 | 12/2005 |
| DE | 102011079632 A1 | 1/2013 |

* cited by examiner

*Primary Examiner* — Kevin Hurley
*Assistant Examiner* — Marlon A Arce
(74) *Attorney, Agent, or Firm* — Hudak, Shunk & Farine Co. LPA

(57) ABSTRACT

A fifth wheel coupling including a coupling plate and a camera, wherein the coupling plate is supported on a towing vehicle by bearing elements, a centrally arranged locking region for receiving a king pin, a support surface at least partially laterally surrounding the locking region for supporting a trailer, as well as an insertion opening running radially from the locking region, which is bordered in a conically widened section on both sides by insertion flanges. The camera is mounted in a position in the region of the fifth wheel coupling with the lowest possible risk of soiling and damage, with the camera being arranged on one of the insertion flanges.

16 Claims, 2 Drawing Sheets

(51) Int. Cl.
*B60D 1/62* (2006.01)
*B60R 11/04* (2006.01)

FIFTH WHEEL COUPLING COMPRISING A COUPLING PLATE AND A CAMERA

FIELD OF THE INVENTION

The invention relates to a fifth wheel coupling with a coupling plate and a camera according to the features in a fifth wheel coupling comprising a coupling plate and a camera, wherein the coupling plate is supported on a towing vehicle by means of bearing elements, a centrally arranged locking region for receiving a king pin, a support surface at least partially laterally surrounding the locking region for supporting a trailer as well as an insertion opening running radially from the locking region, which is bordered in a conically widened section on both sides by insertion flanges.

BACKGROUND OF THE INVENTION

The fifth wheel coupling is usually arranged on a towing vehicle and is used to mechanically connect a trailer to the towing vehicle by means of a king pin attached thereto. For this purpose, the fifth wheel coupling has a coupling plate which is supported on the towing vehicle via bearing elements and a locking mechanism for locking the king pin which is usually provided on the underside of the coupling plate. During coupling, the towing vehicle approaches the stationary semi-trailer backwards, so that the king pin enters an insertion opening of the fifth wheel coupling and is guided from there until it reaches its end position in a locking region.

With the help of a camera attached to the towing vehicle, the approach of the towing vehicle to the trailer should be simplified or even automated for the driver. For this purpose, US 2014/0151979 A1 proposes mounting the camera on a crossbar which is arranged between the bars of the towing vehicle specifically for the camera and which is arranged in the longitudinal direction of the vehicle between the fifth wheel coupling and the rear of the towing vehicle. As a result, the camera can be aligned in the middle of the vehicle's longitudinal axis and should thereby enable the towing vehicle to approach the trailer exactly. However, it has turned out to be disadvantageous that the camera is located behind the wheels of the towing vehicle and is particularly exposed to dirt that is thrown up, which leads to a significant optical impairment of the camera.

Furthermore, a position of the camera at the rear end of the towing vehicle means that the camera can easily be hit and destroyed by the king pin when the air suspension is extended during coupling. Since the rear-facing camera is run over by the king pin very early and the camera no longer detects the close-up detection of the king pin when it enters the insertion opening of the coupling plate, a second, forward-facing camera is required, which makes the entire system relatively expensive.

Document DE 10 2004 029 130 A1 establishes another state of the art with a camera that is to be arranged under or in the fifth wheel coupling in order to be able to detect the king pin much more easily due to the central position of the camera than if the camera were on one side of the fifth wheel coupling. However, a camera position located in the longitudinal axis of the vehicle has the disadvantageous consequence that the camera is always located in the area of influence of the king pin and is therefore exposed to an increased risk of damage. In addition, the locking region located in the center of the coupling plate is always supplied with lubricating grease, which constantly gets onto the camera and also causes optical impairments there.

SUMMARY OF THE INVENTION

The object of the invention therefore was to mount the camera in a position in the region of the fifth wheel coupling with the lowest possible risk of soiling and damage.

The object of the invention is achieved according to the features of a fifth wheel coupling comprising a coupling plate and a camera, wherein the coupling plate is supported on a towing vehicle by means of bearing elements, a centrally arranged locking region for receiving a king pin, a support surface at least partially laterally surrounding the locking region for supporting a trailer as well as an insertion opening running radially from the locking region, which is bordered in a conically widened section on both sides by insertion flanges, wherein the camera is arranged on one of the insertion flanges.

The coupling plate is held pivotable about the transverse direction by two bearing brackets spaced apart from one another in the transverse direction. Between the bearing brackets there is a locking region in the center of the coupling plate, in which a king pin of a semi-trailer that is held that has been fully inserted into the coupling plate. When a trailer is coupled, a trailer plate of the trailer is supported from above on a support surface of the coupling plate surrounding the locking region. A channel-shaped insertion opening running through the coupling plate for the king pin to pass through during coupling and uncoupling ends in the locking region. The insertion opening is formed at an end remote from the locking region with a section that widens conically to the outside. This conically widened section of the insertion opening is delimited on both sides by insertion flanges. The insertion flanges define the end of the coupling plate at the rear of a fifth wheel coupling mounted on a towing vehicle. In the direction of the locking region, the insertion flanges merge into the support surface of the coupling plate at the narrow end of the conically widened section of the insertion opening.

The camera is located on one of the insertion flanges. This results in the advantage that no superstructures of the towing vehicle protrude into the field of view of the camera, since the space between the fifth wheel coupling and the semi-trailer must remain free for the coupling process. In addition, the camera is in close proximity to an air suspension system that is usually installed on a rear axle of the towing vehicle, so that the height of the camera approximately corresponds to the extended state of the air suspension system and the data provided by the camera does not need to be corrected mathematically.

For early detection of a trailer, the camera should have an optical axis that is preferably aligned parallel to the axial extension of the insertion opening.

According to a first embodiment of the invention, the camera is advantageously attached to an underside of one of the insertion flanges. As a result, the camera is largely protected from mechanical influences while driving, but also from dirt.

A configuration is particularly preferred in which the camera is arranged within an outer contour spanned by the coupling plate and a camera opening is provided in the respective insertion flange with the camera. The outer contour spanned by the coupling plate is understood to mean a free installation space which is covered at the top by the respective insertion flange, optionally surrounded at the side by a stiffening apron and being preferably open at the bottom. The camera opening can be a bore or an open recess in a wall profile of the respective insertion flange equipped with the camera.

The insertion flanges can possess an access ramp on their top side that is inclined upwards in the direction of the support surface, and the camera opening can be formed in one of the access ramps. The access ramps run from a low distal level, rising in the direction of the support surface and are used to drive under a slightly lower-aligned trailer plate of a trailer to be coupled and to raise it by approaching it further after making contact. The trailer plate of the trailer then slides over the ramps until it reaches the support surface. In the case of a fifth wheel coupling mounted on a towing vehicle, the access ramps regularly form a rear end of the insertion flanges. The camera opening is dimensioned and arranged in such a way that a trailer plate of the trailer slides over it during coupling.

According to a particularly favorable embodiment, the insertion flanges have a stiffening apron aligned perpendicularly to the support surface, and the camera opening is formed in the stiffening apron. The stiffening apron is a stiffening rib which advantageously follows the outer circumference of the coupling plate at least in sections and also engages on the insertion flanges from below.

In an alternative, second embodiment of the invention, the camera can be arranged on a side of the insertion flange facing away from the insertion opening. The camera is therefore outside the outer contour of the coupling plate. This allows the camera to be checked particularly well and, under certain circumstances, also repaired.

The camera is expediently arranged at a lateral distance from the adjacent insertion flange, which reduces the risk of being caught and destroyed by a king pin standing too far to the side.

The camera is sensibly carried by a camera holder wherein the camera holder engages the coupling plate, in particular one of the insertion flanges.

The camera is preferably arranged in the transverse direction of the coupling plate below a vertical level of a top side of the insertion flanges. Likewise, the camera holder should be level below the level of the top of the insertion flanges. This results in the advantage that even a very low-lying trailer plate slides over the camera and/or its camera holder during coupling without damaging it.

For all embodiments, it can be advantageous if the coupling plate is forcibly aligned in the load-free state by means of a spring element. A forced alignment is understood to mean an inclination of the coupling plate about its transverse direction in such a way that the tops of the insertion flanges with their access ramps may be more inclined than when the support surface is aligned parallel to a vehicle frame or a mounting plate of the fifth wheel coupling. In addition to advantages when coupling the trailer, the forced alignment of the coupling plate enables a defined alignment of the camera before coupling, which means that the target area on the trailer to be captured by the camera is better recognized.

The bearing elements favorably comprise a displacement device with which the coupling plate can be moved linearly between a front and a rear position. With the help of a displacement device, the position of the coupling plate can be adjusted in the longitudinal direction relative to the vehicle frame. If a displacement device is installed on the towing vehicle, the camera, which is always installed in a fixed position on the coupling plate, changes its position by the same amount as the coupling plate, so that the data output by the camera does not have to be corrected mathematically.

BRIEF DESCRIPTION OF THE DRAWINGS

For a better understanding, the invention is explained in more detail below with reference to four figures showing in
FIG. 1: a perspective view of a fifth wheel coupling with a camera according to a first embodiment.

DETAILED DESCRIPTION OF THE INVENTION

Figure 1:
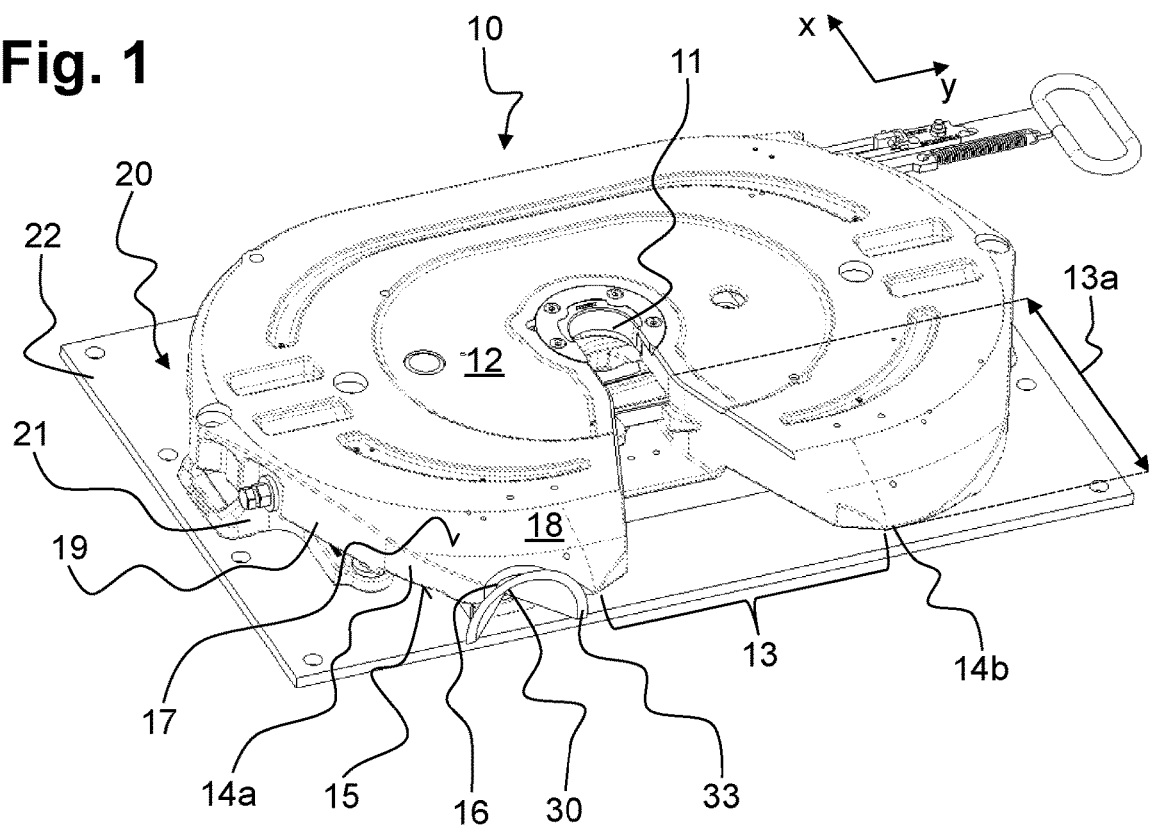
Figure 2:
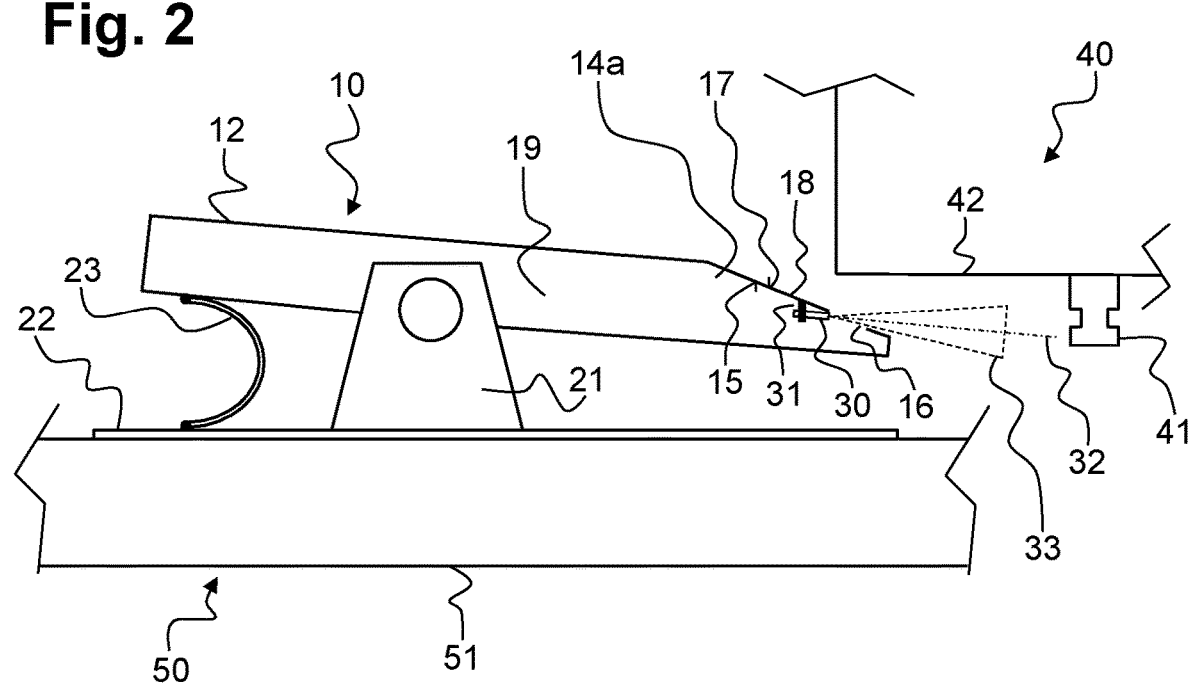
FIG. 2: a longitudinal section of the fifth wheel coupling in a sectional plane running through one of the insertion flanges according to FIG. 1 with a camera opening located in the access ramp.

FIG. 1 shows a perspective view and FIG. 2 shows a longitudinal section of a first embodiment of the invention comprising a coupling plate 10 with a camera 30 attached to it. The coupling plate 10 has a locking region 11 arranged centrally therein, in which a king pin 41 of a trailer 40 can be retracted and locked (see FIG. 2).

The coupling plate 10 is connected to a vehicle frame 51 of a towing vehicle 50 via bearing elements 20. The bearing elements 20 include, in particular, two bearing brackets 21 which are arranged on both sides of the locking region 11 in the transverse direction y of the coupling plate 10 and enable a pivoting movement of the coupling plate 10 about an axis running in the transverse direction y. In the illustration in FIG. 1, the bearing brackets 21 are fastened to a further bearing element 20 in the form of a mounting plate 22 which is placed on the vehicle frame 51 and is connected to it in a stationary manner.

The locking region 11 of the coupling plate 10 is surrounded by a flat support surface 12 on which a trailer plate 42 of the trailer 40 can be supported in the coupled state. In the longitudinal direction x of the coupling plate 10, the locking region 11 merges into an insertion opening 13, through which the king pin 41 travels while a trailer 40 is being coupled and uncoupled. At its distal end, the insertion opening 13 has a conically widened section 13a, with the help of which a king pin 41, which is slightly offset in the transverse direction y to the coupling plate 10, is grasped and, as it approaches further, is fed to the locking region 11 arranged centrally in the coupling plate 10.

The conically widened section 13a of the insertion opening 13 is delimited on both sides by an insertion flange 14a, 14b. The insertion flanges 14a, 14b extend in the longitudinal direction x of the coupling plate 10 over the entire conically widened section 13a of the insertion opening 13.

The insertion flanges 14a, 14b are an integral part of the coupling plate 10. In addition to the lateral guidance of a king pin 41, the insertion flanges 14a, 14b correct the height of a trailer plate 42 that is occasionally set too low. For this purpose, the insertion flanges 14a, 14b, starting from their rear end in the longitudinal direction x, are designed with an access ramp 18 that rises in the direction of the support surface 12.

According to the exemplary embodiment shown in FIG. 1, the camera 30 is fastened to the insertion flange 14a, arranged on an underside 15 of the insertion flange 14a and is located under the access ramp 18 in an area protected by the outer contour of the coupling plate 10 and the insertion flange 14a. The outer contour is understood to mean a construction space which is open at the bottom and is surrounded at the top by the access ramps 18 and laterally by a stiffening apron 19. The stiffening apron 19 engages the coupling plate 10 and follows its course at the edge up to the insertion flanges 14a, 14b. Because the camera 30 is mounted within the outer contour of the insertion flange 14a, it is particularly well protected against external mechanical influences.

In the insertion flange 14a with the camera 30 accommodated therein, a camera opening 16 is formed in the access ramp 18 and/or the stiffening apron 19 adjoining the access ramp 18, wherein the camera opening 16 is aligned with the optics of the camera 30 and enables image acquisition. The camera opening 16 can be a hole or a cutout in the access ramp 18 and/or the stiffening apron 19. A vision cone 33 passes from the camera 30 through the camera opening 16 in the direction of the trailer 40 and/or its king pin 41 (FIG. 2). The camera 30 is preferably arranged under the access ramp 18 of the insertion flange 14a. A stationary attachment of the camera 30 to the coupling plate 10 takes place by means of a camera holder 31, which preferably engages the underside 15 of the insertion flange 14a.

FIG. 2 illustrates the alignment of the vision cone 33 around an optical axis 32 of the camera 30, essentially parallel to the longitudinal direction x of the coupling plate 10. The vision cone 33 is fanned out to such an extent that, regardless of the alignment of the coupling plate 10 with respect to the bearing brackets 21 the trailer 40 and/or the king pin 41 are captured by the camera 30.

The coupling plate 10 can be forcibly aligned before a trailer 40 is coupled, in particular by means of a spring element 23, whereby on the one hand a defined impact of the trailer plate 42 on the access ramps 18 of the insertion flanges 14a, 14b is achieved, but at the same time the vision cone 33 of the camera 30 is also aligned in a defined Position so that relevant components of the trailer 40 such as the king pin 41 migrates into in the vision cone 33, when the towing vehicle 50 roughly approaches the trailer 40.

Figure 3:
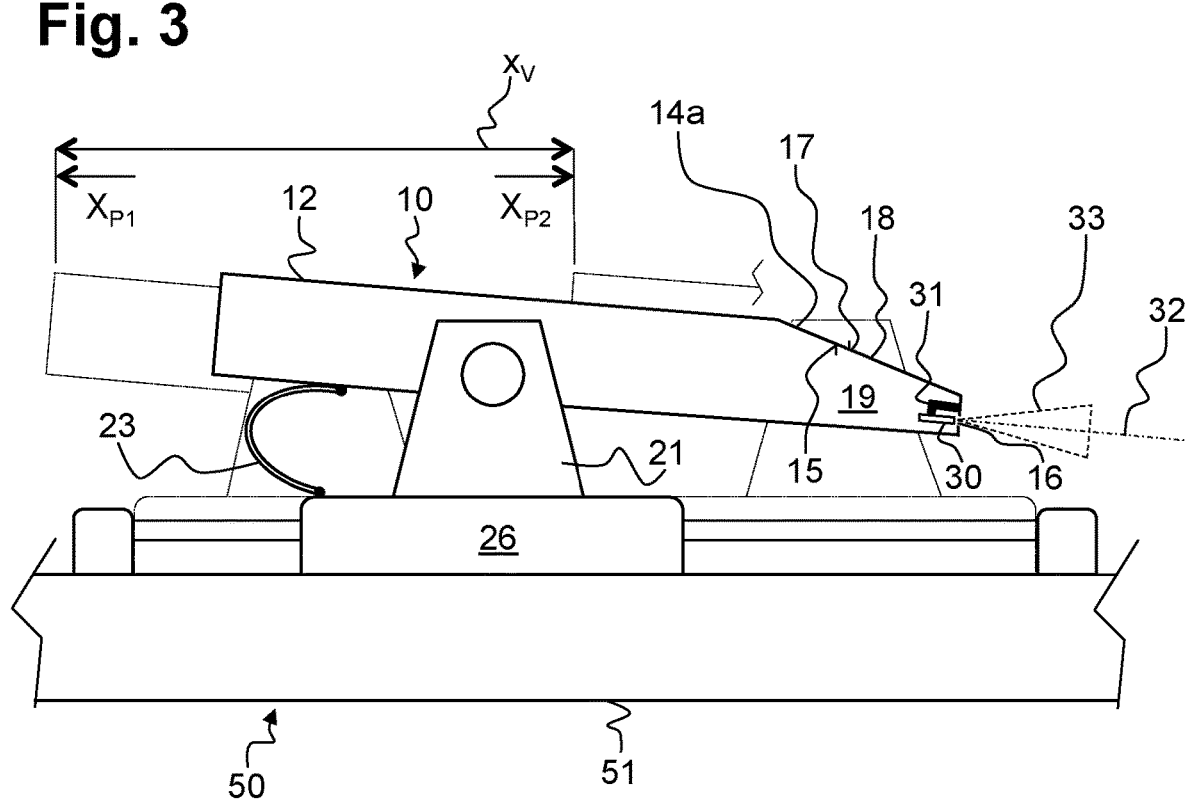
FIG. 3: a longitudinal section according to FIG. 2 with a camera opening in the stiffening apron

FIG. 3 shows an exemplary embodiment of the invention, in which the camera 30 is fastened by means of the camera holder 31 to a stiffening apron 19 which is shaped to below the access ramp 18 of the insertion flange 14a. The camera opening 16 is also formed in the stiffening apron 19 at the end of the insertion flange 14a.

The fifth wheel coupling of FIG. 3 has additional bearing elements 20 belonging to a displacement device 24, with which an adjustment of the coupling plate 10 in the longitudinal direction x is possible. For this purpose, the displacement device 24 comprises a carriage 26 which carries both bearing brackets 21 and is movably held by two guide rails 25 which are parallel in the longitudinal direction x. The guide rails 25 are fixed to the vehicle frame 51 of the towing vehicle 50. The coupling plate 10 can thus be held between a front position $X_{P1}$ and a rear position $X_{P2}$ of the carriage 26 according to a traversing path xv of the displacement device 24. The fixed position of the camera 30 in relation to the coupling plate 10 is advantageous in that when the carriage 26 is adjusted in the longitudinal axis x of the coupling plate 10, the camera 30 also moves with it and no calculational correction of the data provided by the camera 30 needs to be carried out.

Figure 4:
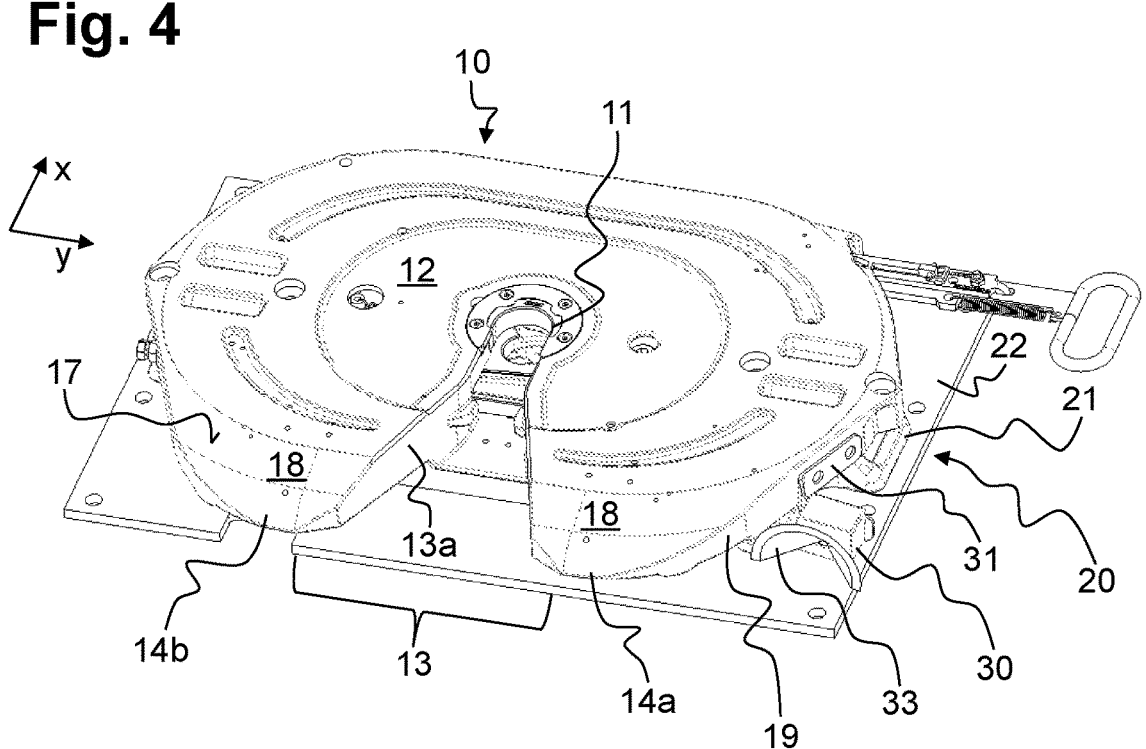
FIG. 4: a perspective view of a fifth wheel coupling with a camera according to a second embodiment.

FIG. 4 shows a perspective view of a further exemplary embodiment, in which the camera 30 is fastened to the insertion flange 14a from the outside by means of the camera holder 31. The vision cone 33 is directed backwards in the direction of the trailer 40 to be coupled. The camera 30 is arranged on the side of the insertion flange 14a facing away from the conically widened section 13a.

The camera 30 is located to the side of the access ramp 18 in the transverse direction y of the coupling plate 10. In order to prevent a collision with the trailer plate 42 while the trailer 40 is being coupled to the towing vehicle 50, the top of the camera 30 is located below a vertical level of a top side 17 of the insertion flanges 14a, 14b and the access ramps 28 formed thereon.

LIST OF REFERENCE NUMERALS 10 coupling plate
11 locking region
12 support surface
13 insertion opening
13a conical widened section insertion opening
14a,b insertion flanges
15 underside insertion flanges
16 camera opening
17 top side insertion flanges
18 access ramp
19 stiffening apron
20 bearing elements
21 bearing bracket
22 mounting plate
23 spring element forced alignment
24 displacement device
25 guide rails displacement device
26 carriage displacement device
30 camera
31 camera holder
32 optical axis camera
33 vision cone camera
40 trailer
41 king pin
42 trailer plate
50 towing vehicle
51 vehicle frame
x longitudinal direction coupling plate
$X_{P1}$ front position carriage
$X_{P2}$ rear position carriage
xv traversing path displacement device
y transverse direction coupling plate

What is claimed is:

1. A fifth wheel coupling, comprising; a coupling plate and a camera, wherein the coupling plate is supported n a towing vehicle by means of bearing elements, a centrally arranged locking region for receiving a king pin, a support surface at least partially laterally surrounding the locking region for supporting a trailer as well as an insertion opening running radially from the locking region, which is bordered in a conically widened section on both sides by insertion flanges, wherein the camera is arranged on one of the insertion flanges.

2. The fifth wheel coupling according to claim 1, wherein the camera is attached to an underside of one of the insertion flanges.

3. The fifth wheel coupling according to claim 1, wherein the camera is arranged within an outer contour spanned by the coupling plate and a camera opening is formed in the insertion flange with the camera.

4. The fifth wheel coupling according to claim 3, wherein the insertion flanges possess an access ramp on their top side inclined upwards in the direction of the support surface and the camera opening is formed in one of the access ramps.

5. The fifth wheel coupling according to claim 1, wherein the insertion flanges have a stiffening apron aligned perpendicularly to the support surface and the camera opening is formed in the stiffening apron.

6. The fifth wheel coupling according to claim 1, wherein the camera is arranged on a side of the insertion flange facing away from the insertion opening.

7. The fifth wheel coupling according to claim 6, wherein the camera is carried by a camera holder wherein the camera holder engages the coupling plate, in particular one of the insertion flanges.

8. The fifth wheel coupling according to claim 6, wherein the camera is arranged in the transverse direction (y) of the coupling plate below a vertical level of a top side of the insertion flanges.

9. The fifth wheel coupling according to claim 1, wherein the coupling plate is forcibly aligned in the load-free state by means of a spring element.

10. The fifth wheel coupling according to claim 1, wherein the bearing elements comprise a displacement device with which the coupling plate can be moved linearly between a front and a rear position ($X_{P1}$, $X_{P2}$).

11. The fifth wheel coupling according to claim 2, wherein the camera is arranged within an outer contour spanned by the coupling plate and a camera opening is formed in the insertion flange with the camera.

12. The fifth wheel coupling according to claim 11, wherein the insertion flanges possess an access ramp on their top side inclined upwards in the direction of the support surface and the camera opening is formed in one of the access ramps.

13. The fifth wheel coupling according to claim 12, wherein the insertion flanges have a stiffening apron aligned perpendicularly to the support surface and the camera pening is formed in the stiffening apron.

14. The fifth wheel coupling according to claim 7, wherein the camera is arranged in the transverse direction (y) of the coupling plate below a vertical level of a top side of the insertion flanges.

15. The fifth wheel coupling according to claim 14, wherein the coupling plate forcibly aligned in the load-free state by means of a spring element.

16. The fifth wheel coupling according to claim 15, wherein the bearing elements comprise a displacement device with which the coupling plate can be moved linearly between a front and a rear position ($X_{P1}$, $X_{P2}$).

\* \* \* \* \*